United States Patent Office 2,777,860
Patented Jan. 15, 1957

2,777,860
CATALYSIS

Robert B. Egbert, Roslyn Heights, and Mitchell Becker, Rego Park, N. Y., assignors to Chempatents, Inc., New York, N. Y., a corporation of Delaware No Drawing. Application July 22, 1954,
Serial No. 445,199

2 Claims. (Cl. 260—346.8)

This invention relates to catalysts useful for the preparation of maleic anhydride by the selective partial oxidation of benzene with molecular oxygen, comprising a modified vanadia and molybdena material supported on previously prepared inorganic compound particles, preferably substantially spherical in shape and of about 0.2 to 0.5 inch in diameter, which particles have a surface area in the range of about 0.002 to 10 square meters per gram; and it relates in particular to such catalysts prepared by coating the support with an aqueous mixture of coating material, followed by drying and heating under critical temperature and air flow conditions to produce a catalyst having a dark green color which is indicative of good catalytic activity.

The preparation of maleic anhydride by the catalytic partial oxidation of benzene is well known and has achieved considerable success commercially. Generally, such processes employ vanadia or vanadia and molybdena material as a catalyst, and this may be supported on a carrier. A serious difficulty with known type processes is the relatively short active life of the catalyst, which is reflected in relatively short onstream operation periods as well as relatively high catalyst cost.

The art is confronted with the problem of providing catalysts and processes for this type reaction which have relatively long onstream reaction periods and also a lower catalyst cost.

The discoveries associated with the invention and relating to the solution of the above problems, and the objects achieved in accordance with the invention as set forth herein include the following: a high activity catalyst useful for the preparation of maleic anhydride by the selective partial oxidation of benzene with molecular oxygen; a process for the preparation of maleic anhydride by the catalytic oxidation of benzene with molecular oxygen in the presence of such a catalyst; a catalyst having the following analytical composition (without regard to the exact chemical combination or form thereof) all parts being by weight:

| Component: | Parts |
|---|---|
| $MoO_3$ | 1 |
| $V_2O_5$ | 1.5–8 |
| $P_2O_5$ | 0.1–0.01 |
| Na | 0.1–0.01 |
| Ni | 0.1–.0001 |

The catalyst composition being supported upon previously prepared refractory inorganic particles, preferably substantially spherical in shape of about 0.2 or 0.5 inch in average diameter, and having a surface area in the range of 0.002 to 10 square meters per gram.

In order to facilitate a clear understanding of the invention, the following preferred embodiments are described in detail:

Example 1

An impregnating solution is made as follows:
In a solution of $(NH_4)_6Mo_7O_{24}.4H_2O$ in concentrated aqueous HCl (35% by weight) there is dissolved $NH_4VO_3$. Then solutions of $Na_3PO_4.12H_2O$ in $H_2O$ and $Ni(NO_3)_2.6H_2O$ in $H_2O$ are added thereto with stirring. After addition is complete, stirring is continued for 15 minutes.

Support particles of ceramically bonded fused aluminum oxide of 4–8 mesh size (U. S. Sieve) are mixed with this solution and the mixture is heated and evaporated to dryness slowly with stirring. The ingredients are mixed according to the following table (without regard to exact chemical composition):

| Component: | Parts |
|---|---|
| Support | 50 |
| $MoO_3$ | 2.49 |
| $V_2O_5$ | 5.23 |
| Na | 0.0545 |
| $P_2O_5$ | 0.0562 |
| Ni | 0.0732 |
| HCl | 36.3 |

The ammonium molybdate is first dissolved in the HCl. A light yellow solution results. When all the molybdate is dissolved, the ammonium meta-vanadate is added. A dark solution results. From past experience it is known that after a period of 10 minutes of agitation, the vanadate is completely dissolved. The solubility of the molybdate is less than that of the vanadate and so it is put into solution first. The nickel and sodium components are dissolved separately in water. The water solutions cannot be mixed due to a nickel phosphate precipitate that results. The sodium phosphate water solution is first added to the HCl solution followed by the addition of the nickel nitrate solution. The entire solution is agitated for 5–10 minutes, after which it is ready to be used for the coating operation.

Generally, in the coating step, the temperature should not exceed about 80° C.

The coated material is placed in an activator such as a Pyrex glass tube 3¾ inch I. D. and 48 inches in length, provided with external heating means such as electric resistance heating elements. The activator is provided with an air inlet at its center (intermediate each end). The activator tube may be set in any desired position, but for convenience, the horizontal position is preferred. The activator is completely filled with a catalyst material and then heated according to the following scale (temperature measured near wall, about 6 inches from one end):

| Temp., ° C. | Air Flow Rate in L./hour | Time in Hours |
|---|---|---|
| 0–175 | 60 | 1 |
| 175–320 | 0 | ½ |
| 320–400 | 60 | ½ |
| 400 | 60 | 5 |

In this way, a high activity dark green catalyst is obtained.

This catalyst is charged into a vertical reactor tube of ⅝ inch internal diameter, to a bed height of 48 inches. The inner surface of the reactor tube may be of ordinary carbon steel, but preferably is of corrosion resistant material, such as stainless steel, and it may be surrounded with a temperature regulating medium, such as molten salt, molten metal or the like. For small scale or single tube runs, the tube may be surrounded by a copper jacket and this jacket surrounded by electrical heating coils, to maintain the desired reaction temperature.

A benzene-air mixture is fed downward through this reactor at a linear velocity of one foot per second calulated at reaction conditions. The feed mixture contains 1.4 mol percent of benzene in air, and the reaction temperature is maintained in the range of 350 to 450° C. Over a long period of time the weight yield of maleic anhydride is in the range of about 75 to 80 percent or more based on the benzene feed; and no evidence is found of decreasing yield with long reaction times. These are surprisingly high yield and catalyst life as compared to commercial catalysts.

This air flow schedule is very critical. If it is increased, particularly when the catalyst temperatuer lies between 100° C. and 320° C., the activity of the catalyst is markedly decreased. For example, if the flow rate is 100 liters per hour, the yield is only 30 percent.

The catalyst can be activated in an oven, under conditions of heating and contact with air. In this case, the catalyst is placed in shallow trays and heated by radiation from above. The oven and the trays should be preheated to about 400° C. The catalyst is then placed in the hot trays and inserted in the oven. The oven temperature should be closely controlled at about 400° C. and the heating should be uniform. Heating is by radiation and the location of the heating elements is such that completely uniform heating occurs. No air circulation is preferred. The depth of catalyst is critical and adjusted such that the catalyst contacts the exact amount of air required. This depth is a function of catalyst particle size, being about ½ inch for a 4-8 mesh (U. S. Sieve) catalyst and ¾ inch for a 2-4 mesh catalyst.

Excessive contact with air results in a poor catalyst. However, air is essential. In cases where air was completely excluded or where it was substituted by nitrogen, a catalyst having a dark blue color resulted, which also gave very poor yields, on the order of 30–40 percent.

The maleic anhydride product is recovered in known manner.

Example 2

The above example is repeated using a coated type catalyst support on ⅜ inch spheres having a roughened outer surface and having a surface area in the range of 0.002 to 10 square meters per gram. These particles may be of alumina, magnesia, zirconia, mullite, beryllia or the like material which is stable at elevated temperatures up to about 600° C. Comparable results to the foregoing are obtained.

However, with this type catalyst a higher throughput is possible with equivalent pressure drop (e. g. about twofold) or alternatively stated, for the same throughput, the onstream life of a catalyst charged in a plant is about twice that of the irregular supported catalyst.

The catalyst supports may be prepared in spherical form in any known manner, forming spheres preferably ranging in diameter from .20 inch to .50 inch. The size of the spheres may be decreased or increased from the preferred size range for particular uses. For commercial operations, a sphere size of ⅜ inch is preferred.

The spheres may be prepared in any convenient manner; e. g. by reduction of the raw materials to finely divided form, e. g., 50–200 mesh, then extruding or otherwise shaping into cylinders of approximately the desired dimension. If desired, a small proportion of finely divided ceramic binder may be included in the raw material, e. g., clay, glass, or the like up to about 15 percent by weight. The soft cylinders are then tumbled until they acquire a spherical shape. The spheres preferably are then tumbled in the presence of a fine powder of 40 mesh particle size more or less, composed of a volatilizable or ignitable material such as naphthalene. The spheres are then kiln roasted, the volatile powder adhering to the spheres being driven off, leaving the surface of each sphere in a highly roughened state, without modifying the overall spherical shape.

The roughened surfaces of the spheres as accomplished above, in no way modify the overall spherical shape of the spheres. The depth of the surface irregularities approximates between .005 to 0.05 of an inch, which enormously increases the outer surface area of the spheres. For example, with magnesia spheres of approximately one quarter inch in diameter, the outer surface area will approximate 110 square inches per pound, containing roughly 560 spheres. The outer surface area of the roughened spheres, on the other hand, will approximate 579,000 square inches per pound, approximately 5,500 times that of smooth spheres.

The preferred alumina spheres are ceramically bonded fused alpha alumina particles having the following physical properties (ASTM method):

Porosity: 41–45% (vol.)
Water absorption: 20–23% (wt.)
Bulk density (indiv. support): 2.1–1.9 gr./cc.
Surface area (nitrogen absorption): 0.025–0.057 sq. m./gr.

Comparable results to the foregoing are achieved with various modifications such as the following: the average diameter of the support particles may be in the range of about 0.2 inch up to about 50% of the diameter of the reaction zone. The reaction zone or tubes may be vertical and of a height of about 3 to 10 feet. The reaction temperature may be in the range of about 350–500° C. The feed gas mixture may be at a pressure in the range of 1.0 to 50 p. s. i. g. (pounds per square inch gauge) and the flow rate such that the residence time is in the range of about 0.1 to 3 seconds (based on gas volume measured at 60° F. and 1 atm. and defined as the time required for a volume of gas equal to the volume of the empty reactor tube to pass therethrough). The feed gas mixture may contain from 1 to 2.5 mol percent of benzene and about 4 to 20 mol percent of oxygen, together with inerts. If desired, a $C_4$ hydrocarbon cut may be used as the hydrocarbon raw material.

The pressure drop through the reactor may be in the range of 0.5 to 10 p. s. i. g. The catalyst may be composed of about 3 to 15 parts by weight of support per part of active catalyst mixture, within the ranges of the composition set forth above.

The activator may be constructed of glass, silica, porcelain, or any suitably resistant alloy. Concerning the activation schedule, the following air flow ranges are suitable:

| Heat Stages | Temp. Range, ° C. | Linear air flow rate in cm./min. |
| --- | --- | --- |
| 1st | up to 175 | 7.0–70. |
| 2d | 175–320 | 0–7.7. |
| 3d | 320–400 | 0.58–21.1. Desirably 3.5–13.0. Preferably 5.8–9.4. |

The catalyst material should be held at 400° C. for at least 30 minutes before increasing the air flow, to speed up desorption of evolved vapors.

The activator may be in any convenient shape, a tubular shape being preferred. The tube may be from 0.5 to 12 feet in length, desirably 3 to 10, and preferably 3 to 7 feet. The tube diameter may be 1 to 8 inches, desirably 2 to 6, and preferably 3 to 5 inches.

The activator may be in the form of a furnace containing trays heated by radiant heat, provided with suitable vents for introducing air and for removing vapors. The oven may be preheated to 400° C., and then a layer of catalyst of a depth approximating the size of the support, is placed on each tray and left therein for about 2 to 3 hours.

This method of catalyst manufacture is also applicable to catalyst prepared by impregnation, by mechanical mixing of catalyst and support powder with or without the use of a pelletizing machine, by catalyst coating techniques using spray methods, or any other technique employing a support and catalyst combination technique using the above formulations and preparations.

The pressure of the reaction mixture should be sufficiently high to force the mixture through the catalyst bed and the associated heat exchange and absorption equipment. However, if the pressure is too high, there is a tendency towards undesirable reactions which may ruin the catalyst. It is desirable that the pressure drop from end to end of the reactor tubes be kept at a minimum; and, from this viewpoint, the substantially regular spherical shaped catalysts used in the present system are markedly superior to the irregular shaped catalysts, inasmuch as the latter are associated with a very much higher pressure drop. When the pressure drop becomes too high, the cost of the power requirements associated therewith make such an operation disadvantageous from the economic viewpoint.

The reaction mixture, temperature, catalyst, and contact time or space velocity of the gaseous mixture are interrelated and suitable combinations thereof are selected to give the desired optimum output and concentration of anhydride in the exit gas.

For high throughput operations, a molten alkali metal, such as sodium, potassium, or mixtures thereof, or fused salt, or diphenyl or diphenyl ether (Dowtherm) may be used as the temperature regulating medium. This is maintained in continuous indirect heat exchange contact with the reaction zone and in indirect heat exchange contact with a cooling medium such as water or the like which may be external to the reactor, or which may be circulated through a special set of tubes in the reactor.

It is indeed surprising that anhydride may be produced with such high output efficiencies in accordance with the invention, especially when one keeps in mind the many undesirable effects or side reactions that may occur during or simultaneously with the desired partial oxidation reaction.

In view of the foregoing disclosures, variations and modifications thereof will be apparent to one skilled in the art and it is intended to include within the invention all such variations and modifications except as do not come within the scope of the appended claims.

We claim:

1. A process for the preparation of maleic anhydride which comprises the partial oxidation of benzene with molecular oxygen in the presence of a catalyst consisting essentially of a refractory support in particulate form of about 0.2 to about 0.5 inch average diameter, and having a surface area in the range of 0.002 to 10 square meters per gram and a mixture of about 1 part $MoO_3$, 1.5 to 8 parts $V_2O_5$, 0.1 to 0.01 part $P_2O_5$, 0.1 to 0.01 part Na, and 0.1 to 0.01 part Ni, containing about 3 to 15 parts per weight of support per part of said mixture, said catalyst being obtained by providing the catalyst support with a mixture of the precursor of the above materials, drying at a temperature up to about 175° C., heating at a temperature in the range of about 175 to 320° C. with a linear air flow through the catalyst in the range of 0 to 7.7 cm./min. and then heating at a temperature in the range of 320 to 400° C. with a linear air flow in the range of 0.58 to 21.1 cm./min. at a temperature in the range of about 400° C. to 550° C., and recovering maleic anhydride from the reaction mixture.

2. A process for the preparation of maleic anhydride which comprises the partial oxidation of benzene with molecular oxygen in the presence of a catalyst containing 50 parts by weight of a refractory support in particulate form of about 0.2 to about 0.5 inch average diameter, and having a surface area in the range of 0.002 to 10 square meters per gram, 2.49 parts $MoO_3$, 5.23 parts of $V_2O_5$, 0.0545 part Na, 0.0562 part $P_2O_5$ and 0.0732 part Ni, said catalyst being obtained by providing the catalyst support with a mixture of the precursor of the above materials, drying at a temperature up to about 175° C., heating at a temperature in the range of about 175 to 320° C. with a linear air flow through the catalyst in the range of 0 to 7.7 cm./min. and then heating at a temperature in the range of 320 to 400° C. with a linear air flow in the range of 0.58 to 21.1 cm./min. at a temperature in the range of about 400° C. to 550° C., and recovering maleic anhydride from the reaction mixture.

References Cited in the file of this patent
UNITED STATES PATENTS

| | | |
|---|---|---|
| 1,809,752 | Jaeger | June 9, 1931 |
| 1,844,388 | Jaeger | Feb. 9, 1932 |
| 1,930,716 | Jaeger | Oct. 17, 1933 |
| 1,935,054 | Jaeger | Nov. 14, 1933 |
| 2,180,353 | Foster | Nov. 21, 1939 |
| 2,294,130 | Porter | Aug. 25, 1942 |
| 2,608,534 | Fleck | Aug. 26, 1952 |